US008682934B2

(12) United States Patent
Hokimoto

(10) Patent No.: US 8,682,934 B2
(45) Date of Patent: Mar. 25, 2014

(54) METADATA GENERATING APPARATUS, INFORMATION PROCESSING APPARATUS, IMAGING APPARATUS, VIDEO CONFERENCE SYSTEM, SECURITY SYSTEM, METHOD OF GENERATING METADATA, AND PROGRAM

(75) Inventor: Akihiro Hokimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1416 days.

(21) Appl. No.: 11/465,002

(22) Filed: Aug. 16, 2006

(65) Prior Publication Data
US 2007/0050397 A1 Mar. 1, 2007

(30) Foreign Application Priority Data
Aug. 26, 2005 (JP) ................................. 2005-245118

(51) Int. Cl.
*G06F 17/30* (2006.01)
(52) U.S. Cl.
CPC .............................. *G06F 17/30044* (2013.01)
USPC ......................................... 707/802; 707/704
(58) Field of Classification Search
CPC ................................................. G06F 17/30044
USPC ............................................ 707/102, 3, 1, 802
See application file for complete search history.

(56) References Cited

U.S. PATENT DOCUMENTS

| 6,567,980 | B1 | 5/2003 | Jain et al. |
| 2003/0123701 | A1 | 7/2003 | Dorrell et al. |
| 2004/0117358 | A1* | 6/2004 | von Kaenel et al. ............... 707/3 |
| 2005/0144225 | A1* | 6/2005 | Anderson et al. .............. 709/203 |
| 2008/0195573 | A1* | 8/2008 | Onoda et al. ....................... 707/1 |

FOREIGN PATENT DOCUMENTS

| EP | 1 560 130 A2 | 8/2005 |
| JP | 2001-292407 | 10/2001 |
| JP | 2003-134435 | 5/2003 |
| JP | 2003-204518 | 7/2003 |
| JP | 2004-120415 | 4/2004 |
| JP | 2004-146959 | 5/2004 |
| JP | 2005-136613 | 5/2005 |
| JP | 2005-184476 | 7/2005 |

OTHER PUBLICATIONS synonym.com defines "captured" as "acquire".*
European Office Action issued Feb. 8, 2012 in EP Application No. 06 017 797.9-2201.

* cited by examiner

*Primary Examiner* — Shahid Alam
(74) *Attorney, Agent, or Firm* — Oblon, Spivak, McClelland, Maier & Neustadt, L.L.P.

(57) ABSTRACT

A metadata generating apparatus generating metadata associated with content data continuously generated in real time includes an additional information acquiring unit that acquires additional information corresponding to at least one piece of the content data and a link information adding unit that adds link information uniquely identifying the at least one piece of the content data corresponding to the additional information to the corresponding additional information to generate the metadata.

16 Claims, 17 Drawing Sheets

FIG. 6

```
<Metadata ... >
<Subject dialect=" ... ">
<VideoStream ... >
  <SystemInfo>
    <sys:Manufacturer>SONY Corporation</sys:Manufacturer>
    <sys:ModelName>SNC-XXXX</sys:ModelName>
    <sys:SerialNumber>0123456789</sys:SerialNumber>
  </SystemInfo>
  <FrameSet size="4">
    <Frame timestamp="2005-07-05T08:20:03.400+09:00" sequenceNumber="43"/>
    <Frame timestamp="2005-07-05T08:20:03.435+09:00" sequenceNumber="44"/>
    <Frame timestamp="2005-07-05T08:20:03.468+09:00" sequenceNumber="45"/>
    <Frame timestamp="2005-07-05T08:20:03.491+09:00" sequenceNumber="46"/>
  </FrameSet>
</VideoStream>
</Subject>
<Body>
  Body of metadata
</Body>
</Metadata>
```

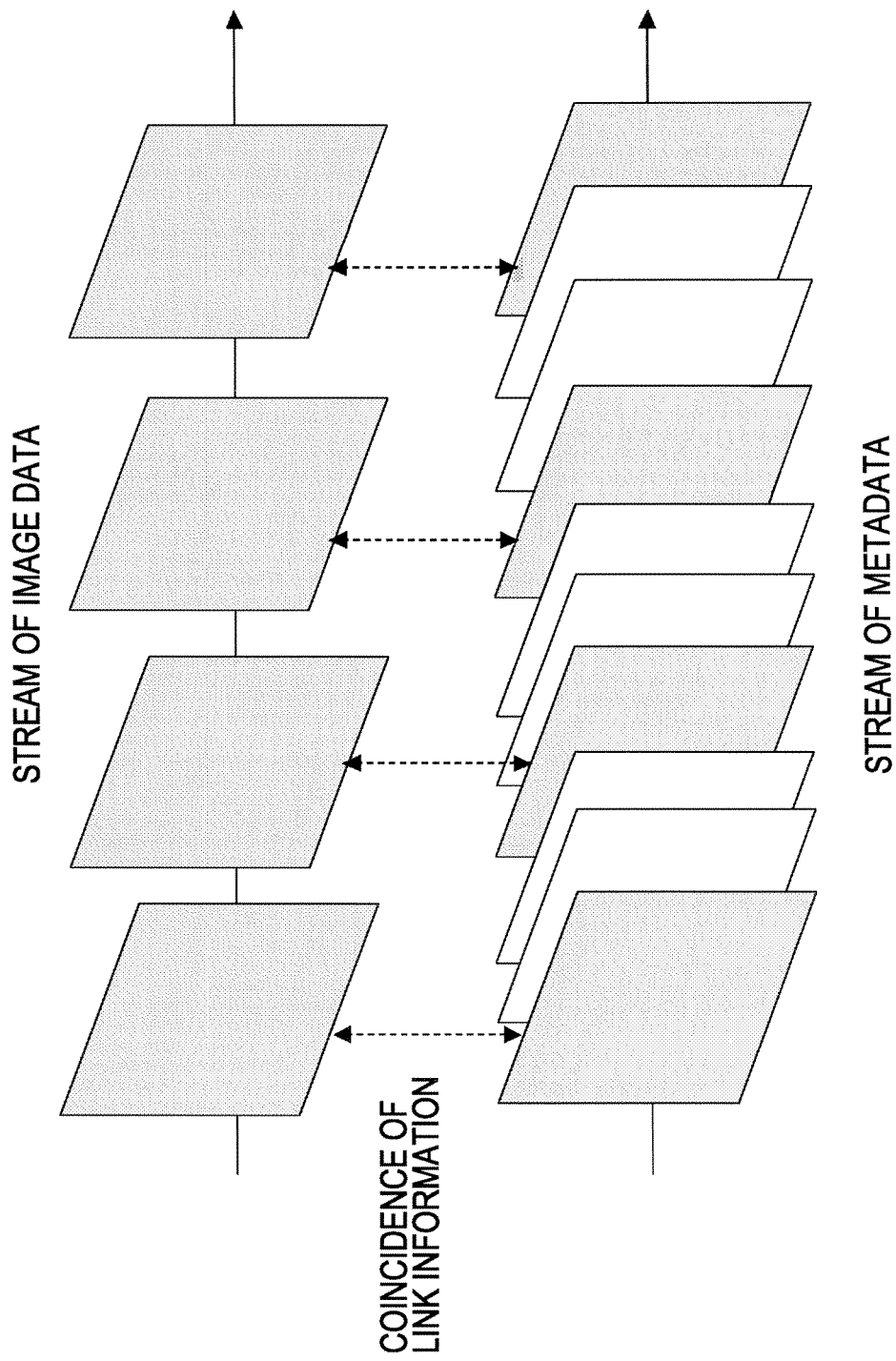

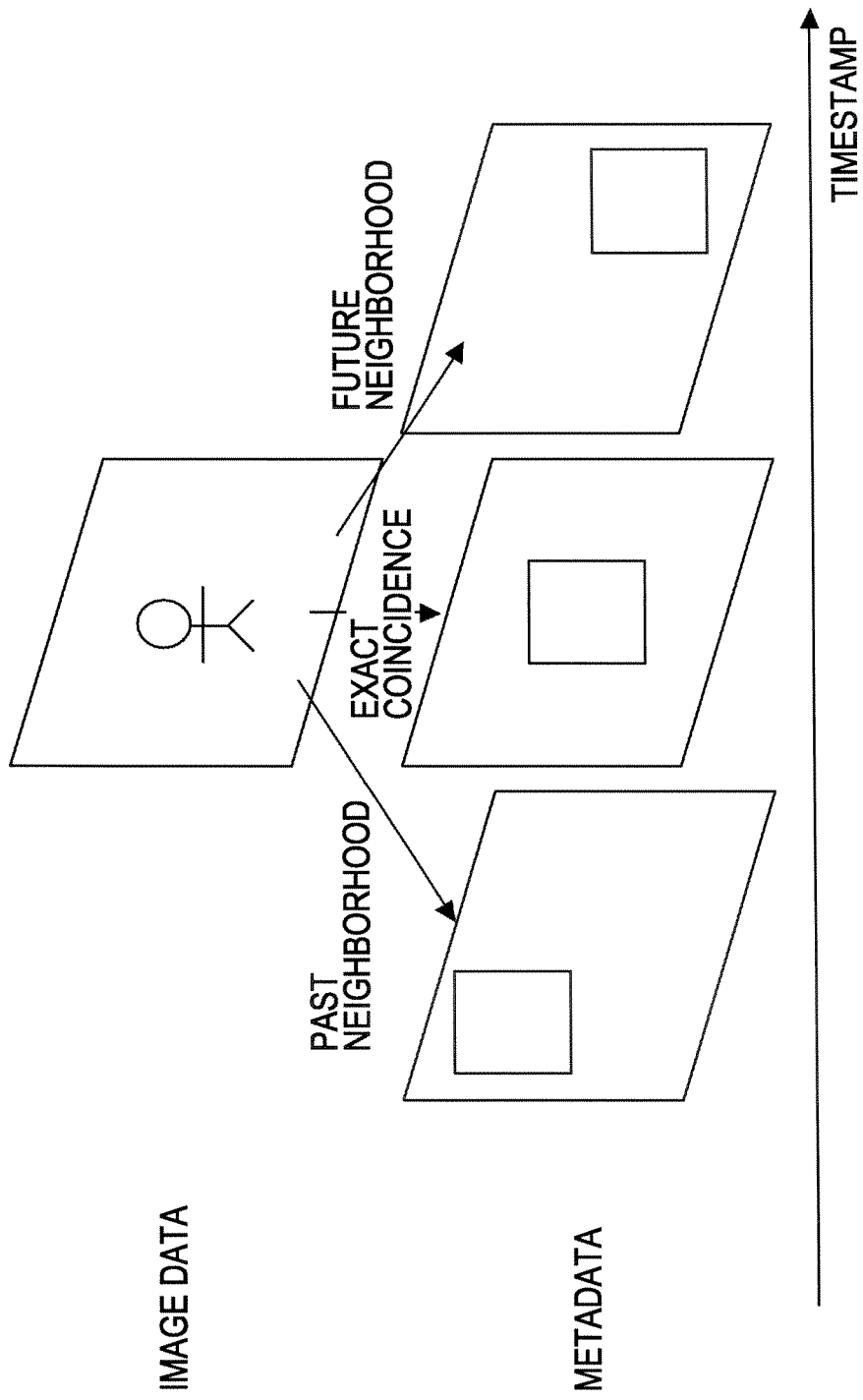

METADATA GENERATING APPARATUS, INFORMATION PROCESSING APPARATUS, IMAGING APPARATUS, VIDEO CONFERENCE SYSTEM, SECURITY SYSTEM, METHOD OF GENERATING METADATA, AND PROGRAM

CROSS REFERENCES TO RELATED APPLICATIONS

The present invention contains subject matter related to Japanese Patent Application JP 2005-245118 filed in the Japanese Patent Office on Aug. 26, 2005, the entire contents of which are incorporated herein by reference.

BACKGROUND OF THE INVENTION

1. Field of the Invention

The present invention relates to a function of generating metadata associated with content data continuously generated in real time. The content data is, for example, image data or audio data.

The present invention is embodied by a metadata generating apparatus, an information processing apparatus, an imaging apparatus, a video conference system, a security system, a method of generating metadata, and a program.

2. Description of the Related Art

The Internet has been developed nowadays and provision of services delivering content data continuously generated in real time over the Internet has begun. For example, provision of security systems and video conference systems that deliver captured image data and/or audio data over the Internet has been started. A supervisory system, a digital supervisory recorder, and a network monitoring system adopting such services are disclosed in Japanese Unexamined Patent Application Publication Nos. 2003-204518, 2004-146959, and 2005-136613, respectively.

SUMMARY OF THE INVENTION

In communication over the Internet, it is necessary to consider the reliability of data and/or an influence of time required for signal processing, appropriate for the intended use of content data.

For example, in security systems, it is desirable to perform a process of detecting falsification during communication or after recording at the transmitter side. In security systems having restricted communication band, it is desirable to detect mobile objects or immobile objects at the transmitter side in order to improve the processing performance.

It is desirable to provide a technology of generating metadata associated with content data continuously generated in real time.

According to an embodiment of the present invention, a metadata generating apparatus generating metadata associated with content data continuously generated in real time includes an additional information acquiring unit that acquires additional information corresponding to at least one piece of the content data and a link information adding unit that adds link information uniquely identifying the at least one piece of the content data corresponding to the additional information to the corresponding additional information to generate the metadata.

According to another embodiment of the present invention, an information processing apparatus processing content data continuously generated in real time includes an additional information acquiring unit that acquires additional information corresponding to at least one piece of the content data; and a link information adding unit that adds link information uniquely identifying the at least one piece of the content data corresponding to the additional information to the corresponding additional information to generate metadata associated with the content data.

According to another embodiment of the present invention, an imaging apparatus continuously generating image data in real time includes an additional information acquiring unit that acquires additional information corresponding to at least one piece of the image data; and a link information adding unit that adds link information uniquely identifying the at least one piece of the image data corresponding to the additional information to the corresponding additional information to generate metadata associated with the image data.

According to another embodiment of the present invention, a video conference system includes an imaging apparatus; a microphone; an additional information acquiring unit that acquires additional information corresponding to content data continuously generated in real time in the imaging apparatus and the microphone; and a link information adding unit that adds link information uniquely identifying at least one piece of the content data corresponding to the additional information to the corresponding additional information to generate metadata associated with the content data.

According to another embodiment of the present invention, a security system includes at least one imaging apparatus; an additional information acquiring unit that acquires additional information corresponding to captured data continuously generated in real time in the imaging apparatus; and a link information adding unit that adds link information uniquely identifying at least one piece of the captured data corresponding to the additional information to the corresponding additional information to generate metadata associated with the captured data.

According to another embodiment of the present invention, a method of generating metadata associated with content data continuously generated in real time includes the steps of acquiring additional information corresponding to at least one piece of the content data; and adding link information uniquely identifying the at least one piece of the content data corresponding to the additional information to the corresponding additional information to generate the metadata.

According to another embodiment of the present invention, a program causes a computer that generates metadata associated with content data continuously generated in real time to perform the steps of acquiring additional information corresponding to at least one piece of the content data; and adding link information uniquely identifying the at least one piece of the content data corresponding to the additional information to the corresponding additional information to generate the metadata.

Application of the technologies according to the embodiments of the present invention allows the correspondence between the content data continuously generated in real time and the metadata to be ensured. As a result, for example, the content data can be transmitted without waiting the completion of the generation of the metadata. It is also possible to transmit the content data asynchronously with the metadata.

BRIEF DESCRIPTION OF THE DRAWINGS

FIG. 6 shows an exemplary description of the link information;

FIG. 8 shows a case in which not all combinations of the image data and the metadata have the same the same link information;

FIG. 9 illustrates association modes in one-to-many correspondence between the content data and the metadata;

DESCRIPTION OF THE PREFERRED EMBODIMENTS

Examples of a metadata generating apparatus according to embodiments of the present invention will be described.

Known or common technologies in the technical field are applied to parts that are not shown in the attached drawings or are not described in this specification.

The embodiments of the present invention described below are only exemplified and the present invention is not limited to the disclosed exemplary embodiments.
Association of Content Data with Metadata

First Embodiment

Processing of content data continuously generated in real time will be described in a first embodiment of the present invention.

Metadata is a collection of information concerning generation of content data corresponding to the metadata and information concerning the result of the processing. The information in the metadata according to the first embodiment of the present invention is similar to that in existing metadata.

The metadata includes, for example, information concerning a date and time when the content data is generated, information concerning settings and conditions of an apparatus when the content data is generated (for example, a pan value, a tilt value, and a zoom value of a camera with which an image is captured), information concerning the content data itself, and information concerning the result of the processing for the content data (for example, data resulting from motion detection, data about a detected immobile object, and signature for detection of falsification).

In the metadata described in the first embodiment, the following data structure is adopted in order to allow the metadata to be processed (including asynchronous transmission) independently of the content data.

Figure 1:
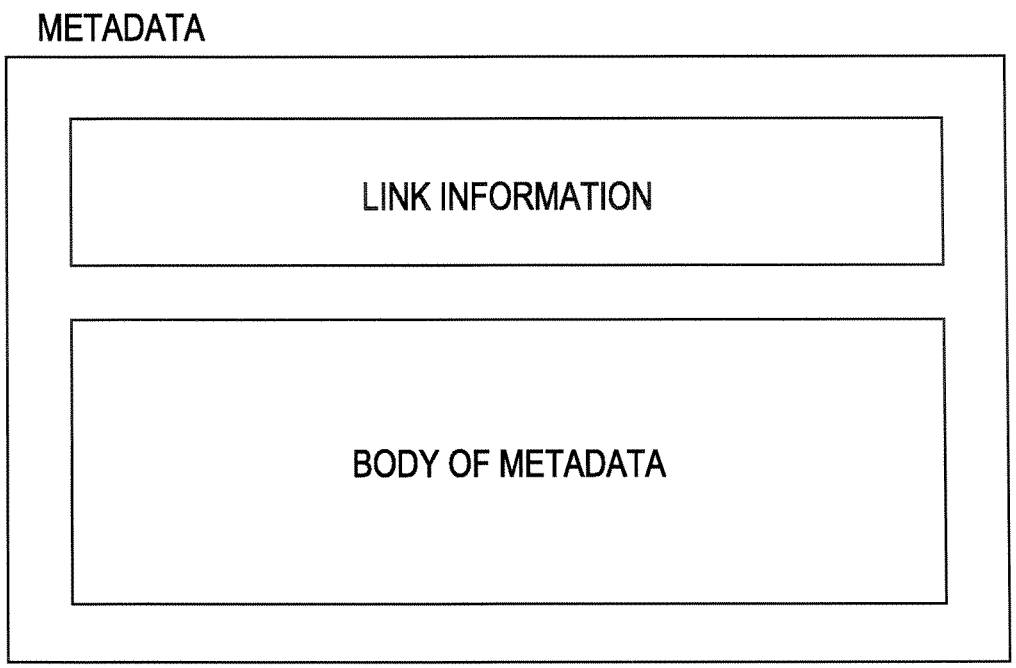
FIG. 1 shows an exemplary data structure of metadata.

FIG. 1 shows an exemplary data structure of the metadata, proposed by an inventor.

Referring to FIG. 1, the metadata includes the body of the metadata and link information. The link information is a description that uniquely identifies one or more pieces of content data corresponding to the body of the metadata.

Figure 2:
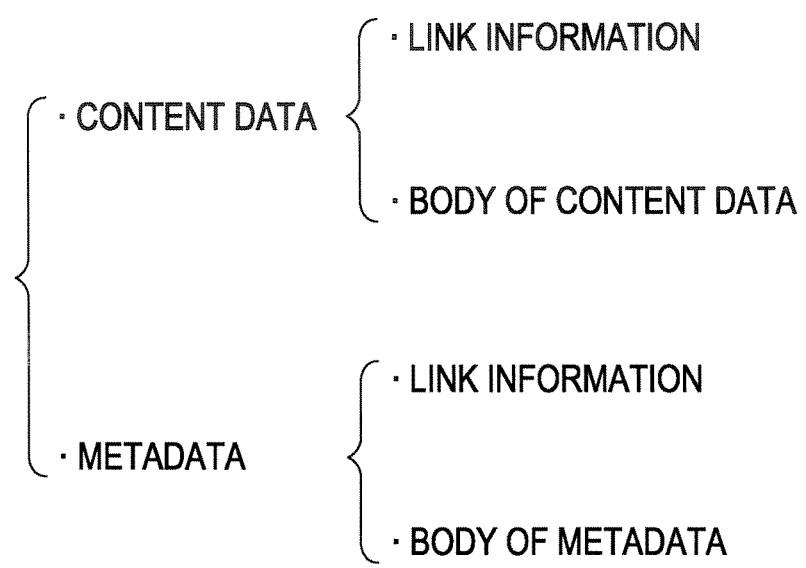
FIG. 2 shows an exemplary data structure of content data and the metadata.

As shown in FIG. 2, the same link information as in the metadata is arranged in the content data. That is, the content data also includes the body of the content data and the link information.

Figure 3:
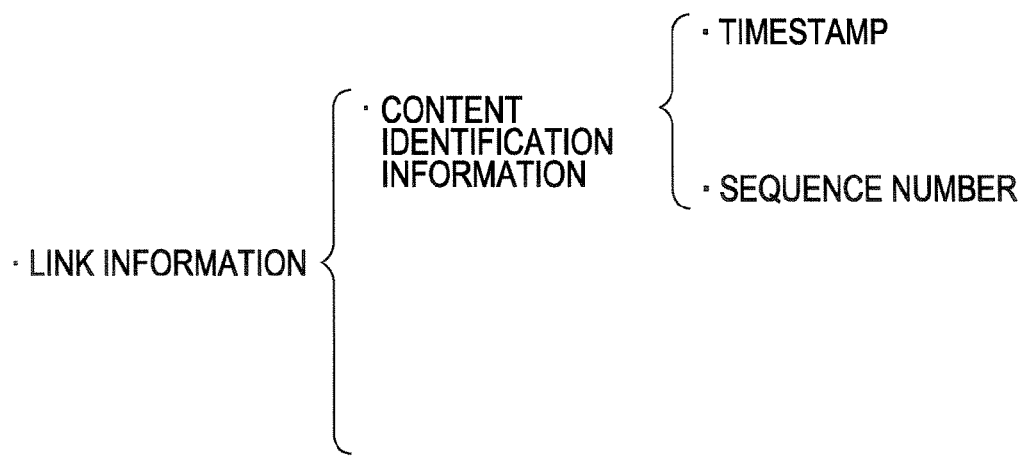
FIG. 3 shows an exemplary structure of link information.

FIG. 3 shows an exemplary structure of the link information. In this example, content identification information is used as the link information.

The content identification information is used for identifying the content data. For example, a timestamp and a sequence number are used as the content identification information.

The timestamp is information (time information) indicating a time when the content data is generated. When the content data is image data, Joint Photographic Experts Group (JPEG), Moving Picture Experts Group (MPEG), and other processing is performed to the image data in a camera apparatus. It is assumed that the timestamp is the time information about original data before the above processing is performed to the image data. Accordingly, an image has the same timestamp before and after encoding.

The sequence number is information (order information) indicating an order of generation of the content data. Like the timestamp, the sequence number is also the order information about the original data. Ordinarily, it seems that the sequence number is not necessary with the timestamp information in milliseconds. However, if the timestamp is provided in seconds, multiple images exist at the same time. In such a case, the sequence numbers are used in order to identify multiple pieces of the content data at the same time.

Figure 4:
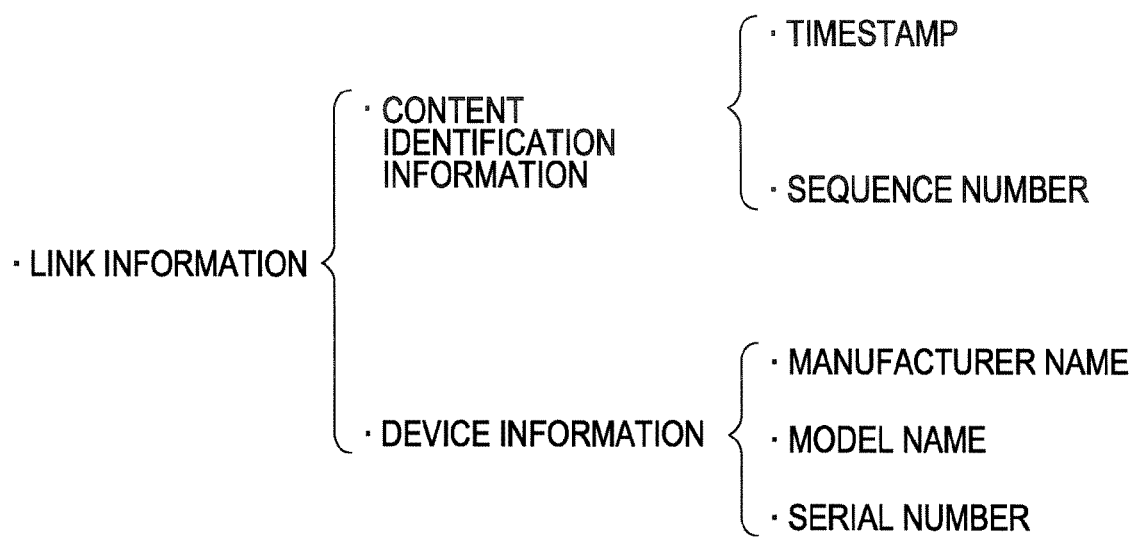
FIG. 4 shows another exemplary structure of the link information.

FIG. 4 shows another exemplary structure of the link information. In this example, device information, in addition to the content identification information, is used as the link information. The device information is used for identifying a device with which the content data is generated. The device information is useful for a system having multiple devices generating the content data. For example, a universally unique identifier (UUID) or a uniform resource locator (URL) may be used as the device information.

Referring to FIG. 4, a manufacturer name, a model name, and a serial number are used as the device information.

The manufacturer name indicates the name of a manufacturer that manufactured the device used for generating the content data. For example, the manufacturer name is a character string "Sony Corporation". "Sony" is a registered trademark of Sony Corporation.

The model name indicates a model name which the manufacturer gives to the device. For example, the model name is a character string "SNC-100".

The serial number is a serial number which the manufacturer assigns to the device. For example, the serial number is a character string "0123456789".

The above information of the three kinds is generally described according to specifications specific to the manufacturer. Accordingly, it is difficult to uniquely define the specifications.

However, if such information is represented by the use of character strings and the consistency between the information is ensured, it is possible to identify devices to some extent despite of different specifications.

The URL may be used as the device information, as described above. The above information of the three kinds is represented by a URL, for example, http://www.sony.jp/product/security/network_camera/SNC-100/0123456789.

Figure 5:
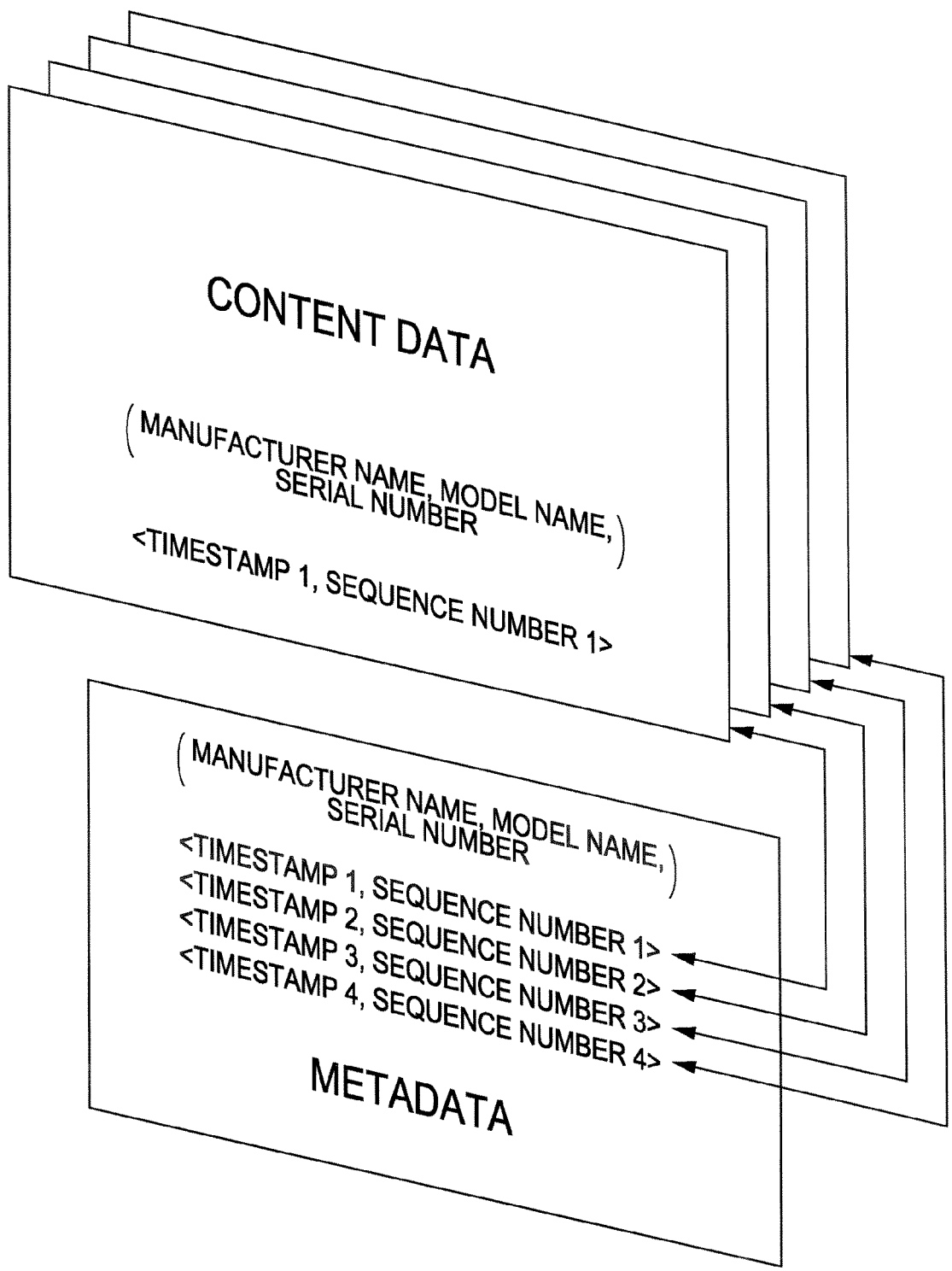
FIG. 5 shows an example illustrating how the link information is used.

FIG. 5 shows an example illustrating how the link information is used. Referring to FIG. 5, four pieces of the link information are used to associate four pieces of the content data with one piece of the metadata. In other words, the four pieces of the content data are associated with one piece of the metadata.

The presence of the link information allows the content data to be later associated with the metadata that is separately transmitted or stored.

In this specification, the term "link information" also means a collection of the four pieces of the link information describing the correspondence with the four pieces of the content data.

In the "link information" in this meaning, the individual pieces of the link information identifying multiple pieces of the content data are arranged in a list.

FIG. 6 shows an exemplary description of the link information in Extensible Markup Language (XML). The content data is image data in the example in FIG. 6.

Referring to FIG. 6, "SystemInfo" denotes device information in which a manufacturer name (Manufacturer), a model name (ModelName), and a serial number (SerialNumber) are described.

"FrameSet size" in FIG. 6 denotes content identification information indicating that four pieces of the content data are associated with the metadata. In the four pieces of the content data, the timestamps and the serial numbers are individually described as the link information identifying the corresponding pieces of the content data.

Figure 7A:
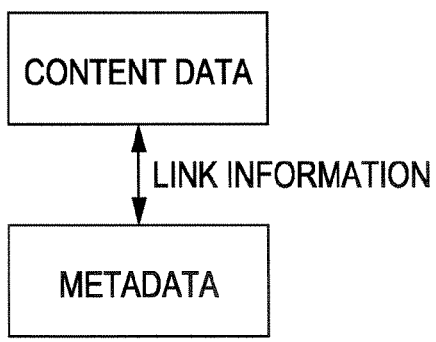
FIGS. 7A to 7C show examples of the correspondence between the content data and the metadata.
Figure 7B:
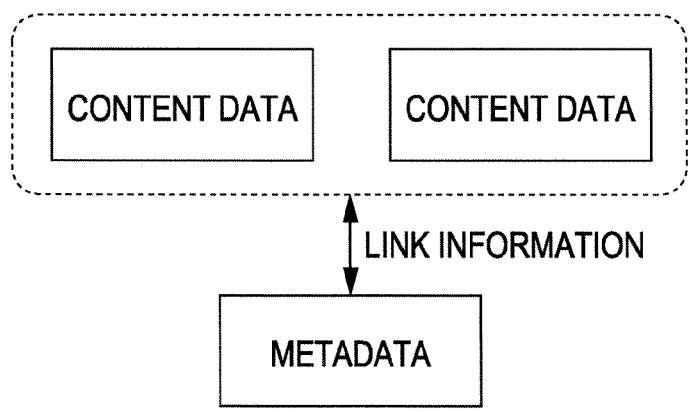
Figure 7C:
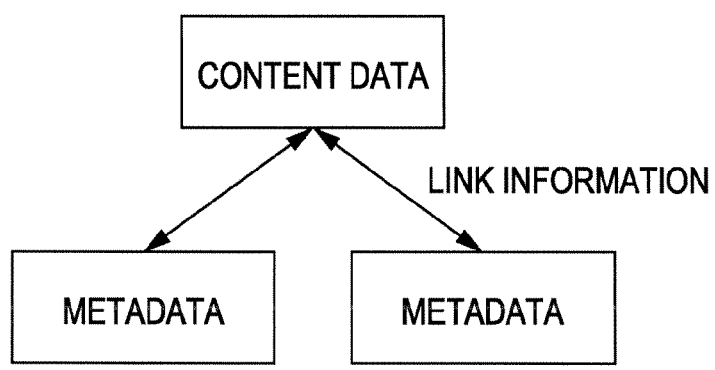

The correspondence between the content data and the metadata is grouped into three types: one-to-one, many-to-one, and one-to-many shown in FIGS. 7A to 7C, respectively.

The examples shown in FIGS. 5 and 6 correspond to the many-to-one type. The many-to-one or one-to-many type is selected depending on the applied service. The pieces of the metadata in the one-to-many type may have pieces of information of the same type described therein or may have pieces of information of different types described therein.

Second Embodiment

As described above, the link information associating the metadata with the content data is embedded in each data.

However, when the information identifying the original content data is used as the link information, a case can happen in which the link information of the content data does not exactly coincide with that of the metadata (a case in which the association between the content data and the metadata is not confirmed).

For example, the above case happens when all the metadata resulting from an analysis does not have the correspondence of the one-to-one type with all the recorded content data.

The above case also happens when the content data and the metadata are not successfully recorded in an image recording apparatus due to a packet drop or the like on the Internet.

Specifically, in an analysis process, such as detection of a mobile object, metadata corresponding to 30 frames can be generated every second for original image data (content data) of 30 frames per second (fps) while the original image data (content data) can be encoded in the JPEG format and the encoded image data can be transmitted over a network at one fps.

In the above case, the metadata corresponding to 30 frames and the image data corresponding to one frame are recoded every second in the image recording apparatus. Accordingly, as for the metadata corresponding to 29 frames, no image data (content data) having the link information coinciding with that of the metadata exists in the image recording apparatus.

Since the image data is transmitted and displayed at one fps, it is possible to record the metadata at one fps.

However, in this case, information concerning the mobile object that appears in the screen within one second and immediately disappears is lost.

Consequently, it is necessary to generate or record the pieces of the metadata, as the ones shown in white in FIG. 8, which have no image data that is directly associated therewith.

If no image data having the link information coinciding with the link information described in the metadata exists, the metadata itself is liable to be considered meaningless.

However, for example, in a surveillance camera, associating the metadata with image data adjacent to the image data that is originally associated with the metadata allows effective use of the metadata having the link information that does not exactly coincide with that of the image data.

The inventor proposes three association modes shown in FIG. 9 in the one-to-many correspondence between the content data and the metadata. The three association modes include exact coincidence, past neighborhood, and future neighborhood.

Figure 10:
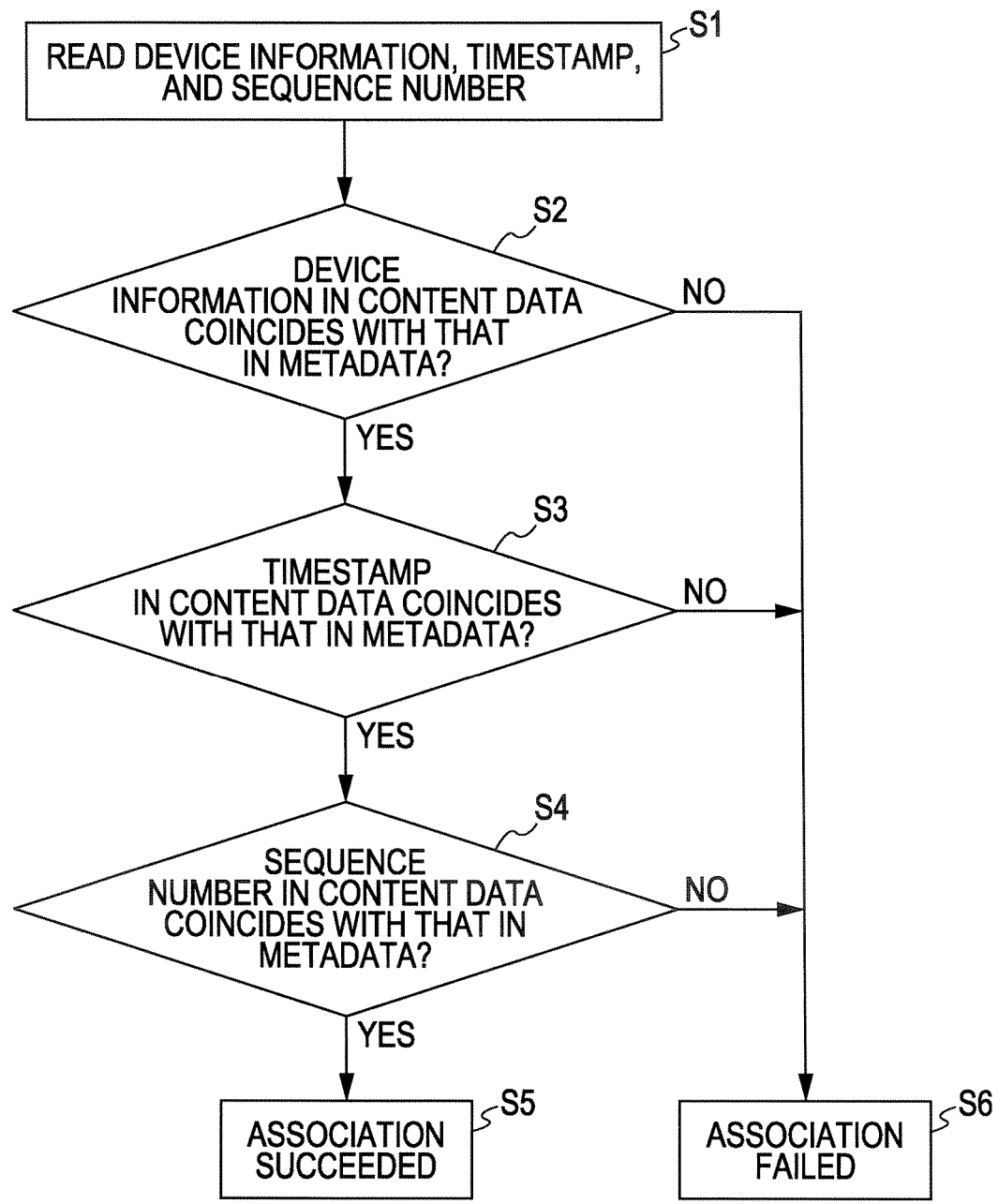
FIG. 10 is a flowchart showing an exemplary association process in "exact coincidence.

FIG. 10 is a flowchart showing an exemplary association process in the "exact coincidence", which is a basic mode. The "exact coincidence", corresponds to the association mode in which the content data is associated with the metadata having the link information exactly coinciding with that of the content data.

Referring to FIG. 10, in Step S1, an information processing apparatus reads out link information in the content data and the metadata. In this example, the information processing apparatus reads out the manufacturer name, the model name, and the serial number as the device information and reads out the timestamp and the sequence number as the content identification information.

In Step S2, the information processing apparatus determines whether the device information in the content data coincides with that in the metadata.

If the device information in the content data coincides with that in the metadata, in Step S3, the information processing apparatus determines whether the timestamp in the content data coincides with that in the metadata.

If the timestamp in the content data coincides with that in the metadata, in Step S4, the information processing apparatus determines whether the sequence number in the content data coincides with that in the metadata.

If the sequence number in the content data coincides with that in the metadata, in Step S5, the information processing apparatus determines that the association succeeded. If any of the above determinations is negative, in Step S6, the information processing apparatus determines that the association failed.

The association process in the exact coincidence is performed in the manner described above.

Figure 11:
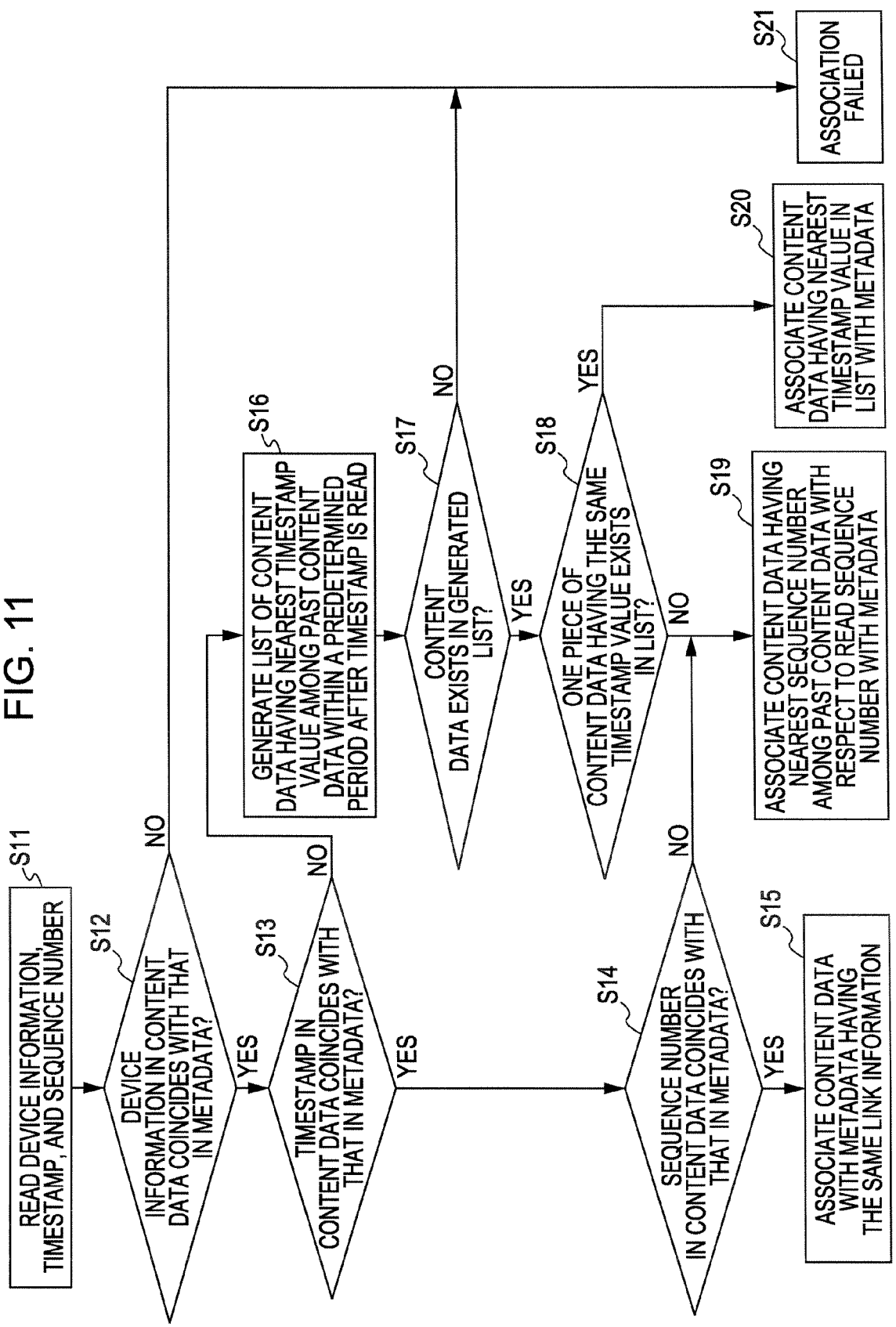
FIG. 11 is a flowchart showing an exemplary association process in "past neighborhood"

FIG. 11 is a flowchart showing an exemplary association process in the "past neighborhood".

The "past neighborhood" corresponds to the association mode in which the content data having a nearest timestamp, among the past content data with respect to the timestamp in specified link information, is associated with the metadata.

Referring to FIG. 11, in Step S11, the information processing apparatus reads out link information in the content data and the metadata. In Step S12, the information processing apparatus determines whether the device information in the content data coincides with that in the metadata.

If the device information in the content data coincides with that in the metadata, in Step S13, the information processing apparatus determines whether the timestamp in the content data coincides with that in the metadata.

If the timestamp in the content data coincides with that in the metadata, in Step S14, the information processing apparatus determines whether the sequence number in the content data coincides with that in the metadata.

If the sequence number in the content data coincides with that in the metadata, in Step S15, the information processing apparatus associates the content data with the metadata having the link information that is coincident with that of the content data.

If the timestamp in the content data does not coincide with that in the metadata (the determination in Step S13 is negative), in Step S16, the information processing apparatus generates a list of the content data having the nearest timestamp, among the past content data with respect to the read timestamp.

The list is generated over a predetermined time period. This is because the association between the content data and the metadata having no correspondence with the content data is possibly established if there is no restriction of time. For example, the list is generated from the past content data within one second after the link information is read.

In Step S17, the information processing apparatus determines whether at least one piece of the content data exists in the generated list.

If at least one piece of the content data exists in the generated list (the determination in Step S17 is affirmative), in Step S18, the information processing apparatus determines whether one timestamp corresponds to one piece of the content data in the list.

If multiple pieces of the content data having the same timestamp do not exist in the list (the determination in Step S18 is affirmative), in Step S20, the information processing apparatus associates the content data having the nearest timestamp in the list with the metadata.

If multiple pieces of the content data having the same timestamp exist in the list (the determination in Step S18 is negative), in Step S19, the information processing apparatus associates the content data having the nearest sequence number, among the past content data with respect to the read sequence number, with the metadata.

Basically, the content data having the largest sequence number is determined to be the nearest content data. However, since the sequence number goes back to zero when the sequence number exceeds a maximum value, it is necessary to determine whether the sequence number exceeds the maximum value.

If any of the determinations in Step S12 and Step S17 is negative, in Step S21, the information processing apparatus determines that the association failed.

The association process in the past neighborhood is performed in the manner described above.

Figure 12:
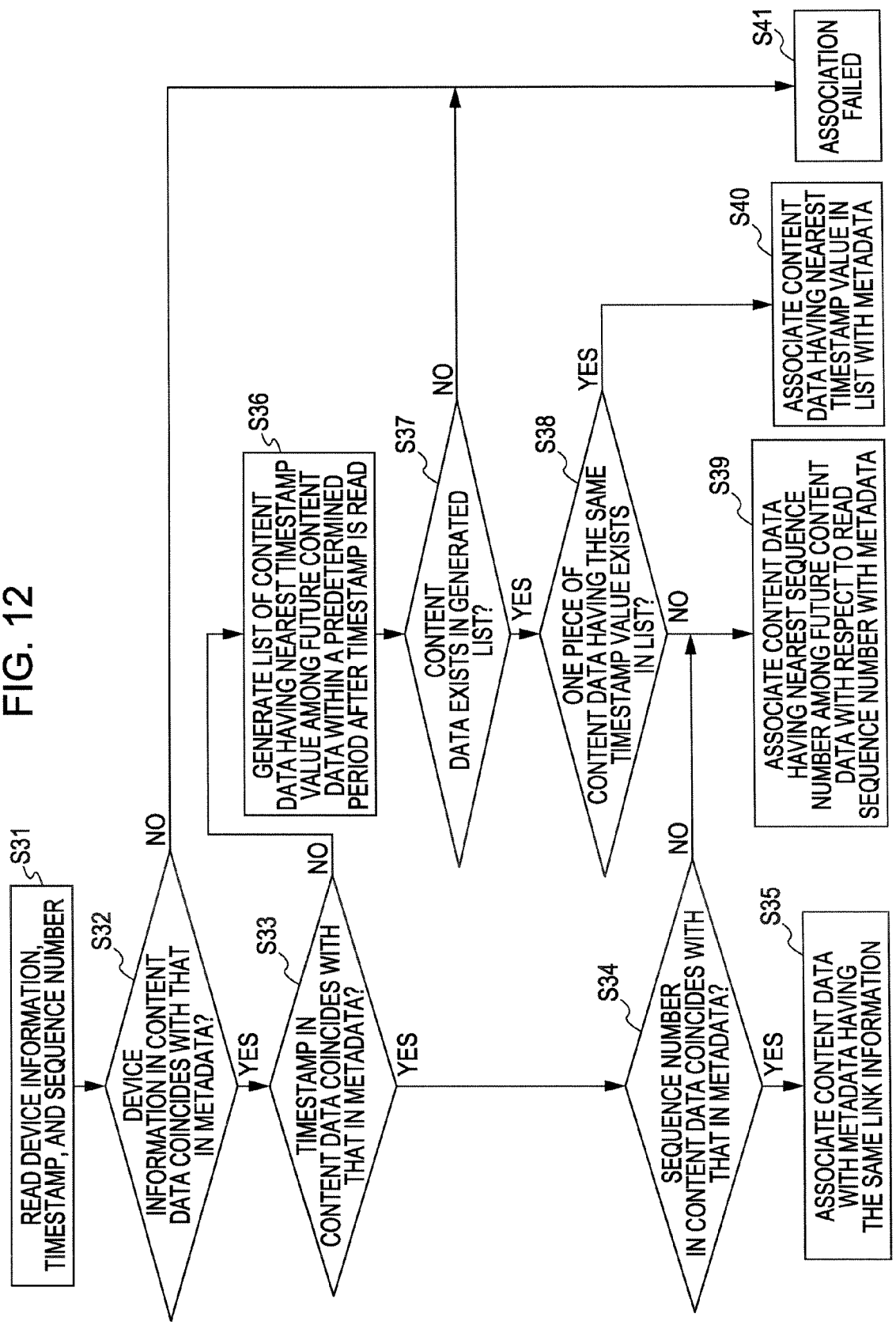
FIG. 12 is a flowchart showing an exemplary association process in "future neighborhood"

FIG. 12 is a flowchart showing an exemplary association process in the "future neighborhood".

The "future neighborhood" corresponds to the association mode in which the content data having a nearest timestamp, among the future content data with respect to the timestamp in specified link information, is associated with the metadata.

Referring to FIG. 12, in Step S31, the information processing apparatus reads out link information in the content data and the metadata. In Step S32, the information processing apparatus determines whether the device information in the content data coincides with that in the metadata.

If the device information in the content data coincides with that in the metadata, in Step S33, the information processing apparatus determines whether the timestamp in the content data coincides with that in the metadata.

If the timestamp in the content data coincides with that in the metadata, in Step S34, the information processing apparatus determines whether the sequence number in the content data coincides with that in the metadata.

If the sequence number in the content data coincides with that in the metadata, in Step S35, the information processing apparatus associates the content data with the metadata having the link information that is coincident with that of the content data.

If the timestamp in the content data does not coincide with that in the metadata (the determination in Step S33 is negative), in Step S36, the information processing apparatus generates a list of the content data having the nearest timestamp, among the future content data with respect to the read timestamp.

The list is generated over a predetermined time period. This is because the association between the content data and the metadata having no correspondence with the content data is possibly established if there is no restriction of time. For example, the list is generated from the future content data within one second after the link information is read.

In Step S37, the information processing apparatus determines whether at least one piece of the content data exists in the generated list.

If at least one piece of the content data exists in the generated list (the determination in Step S37 is affirmative), in Step S38, the information processing apparatus determines whether one timestamp corresponds to one piece of the content data in the list.

If multiple pieces of the content data having the same timestamp do not exist in the list (the determination in Step S38 is affirmative), in Step S40, the information processing apparatus associates the content data having the nearest timestamp in the list with the metadata.

If multiple pieces of the content data having the same timestamp exist in the list (the determination in Step S38 is negative), in Step S39, the information processing apparatus associates the content data having the nearest sequence number, among the future content data with respect to the read sequence number, with the metadata.

Basically, the content data having the smallest sequence number is determined to be the nearest content data. However, since the sequence number goes back to zero when the sequence number exceeds a maximum value, it is necessary to determine whether the sequence number exceeds the maximum value.

If any of the determinations in Step S32 and Step S37 is negative, in Step S41, the information processing apparatus determines that the association failed.

The association process in the past neighborhood is performed in the manner described above.

When the many-to-one correspondence is established between the content data and the metadata, the content data is replaced with the metadata in the processes described above.

Advantages

As described above, the correspondence between the content data continuously generated in real time and the metadata can be always ensured by describing the link information necessary for the association with the content data in the metadata and describing the link information necessary for the association with the metadata in the content data.

Accordingly, even when the metadata is transmitted asynchronously with the content data in a stream different from that of the content data (refer to FIG. 8) or even when the metadata is recorded independently of the content data, it is possible to maintain the correspondence between the content data and the metadata.

Figure 13:
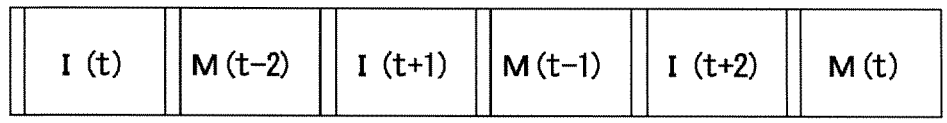
FIG. 13 shows an exemplary data format in which the metadata is embedded in the content data.

In a data format in which the metadata is embedded in the content data, a time delay corresponding to a time required for generating the metadata can irregularly occur, as shown in FIG. 13. Even in such a case, it is possible to ensure the correspondence between the content data and the metadata.

In the data format in which the metadata is embedded in the content data, the metadata may be transmitted asynchronously with the content data in the same stream. For example, the metadata may be transmitted asynchronously with the content data in the order of, for example, the content data, the content data, the metadata, the content data, . . . .

Since the correspondence is maintained even when the metadata is transmitted asynchronously with the content data, it is possible to transmit results of signal processing requiring time as the metadata. In other words, an analysis process having a heavy process load, such as a process of detecting a mobile object or a process of generating signature data for detection of falsification, can be arranged at the transmitter side.

The use of the link information allows the association between the content data and the metadata to be arbitrarily performed in accordance with a request from an application program. Accordingly, it is possible to give a greater freedom to the application program using the metadata.

In addition, since it is possible to ensure the correspondence between the content data and the metadata not only in the one-to-one type but also in the many-to-one type and the one-to-many type, the metadata can be applied to or used for any application.

For example, the metadata can be applied to a case in which the image data, which is the content data, is recorded at one fps and the metadata, which is a result of detection of a mobile object, is recorded at 30 fps.

Figure 14:
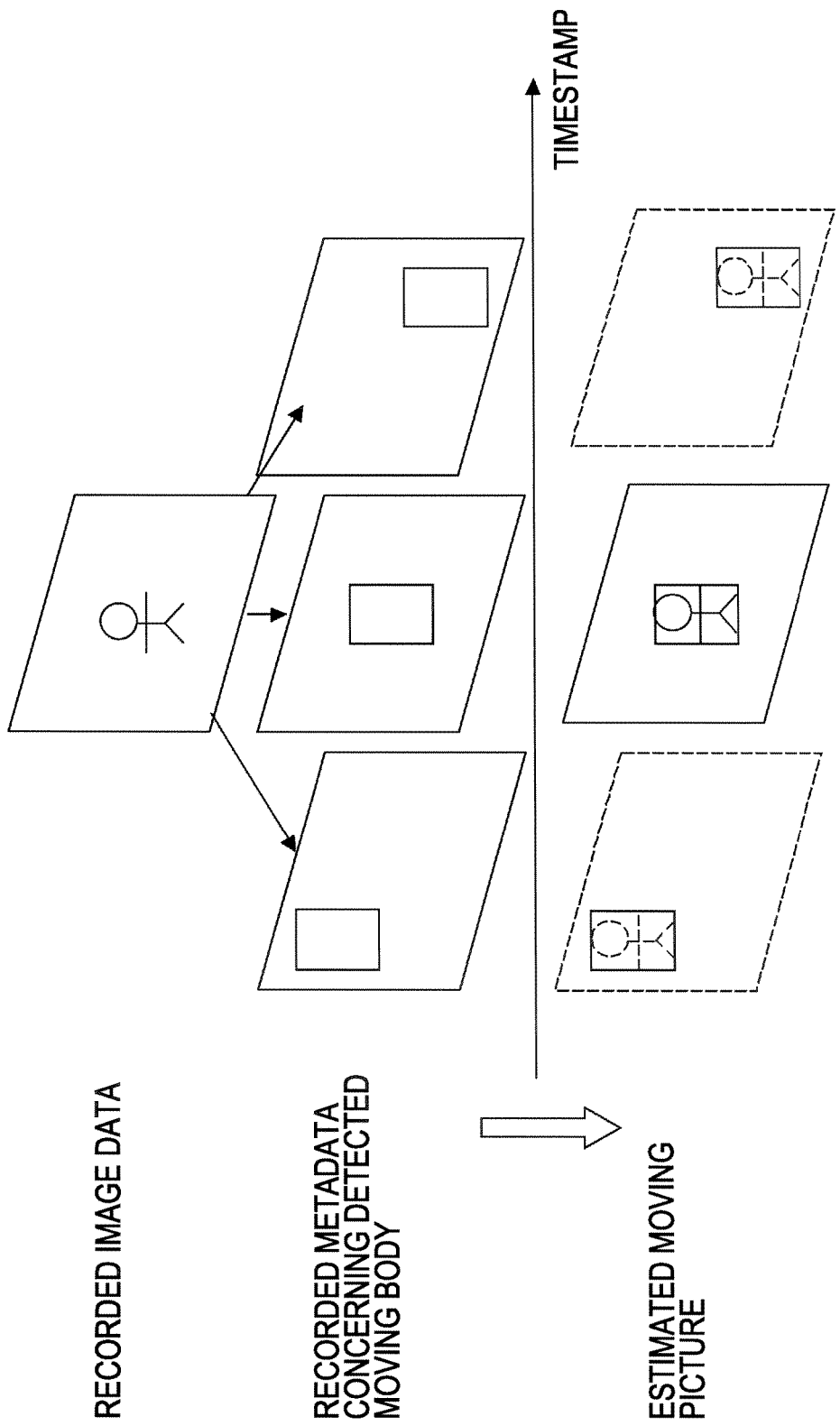
FIG. 14 shows an output example when the metadata includes results of detection of a mobile object.

In this case, developing the concept of the "past neighborhood" and the "future neighborhood" to associate the recorded image data with pieces of the metadata (data concerning the detected mobile object) within one second before and after the recorded image data allows a moving picture of an object (for example, a person) detected on the screen to be estimated and output, as shown in FIG. 14.

Exemplary Metadata Transmitting Unit

Figure 15:
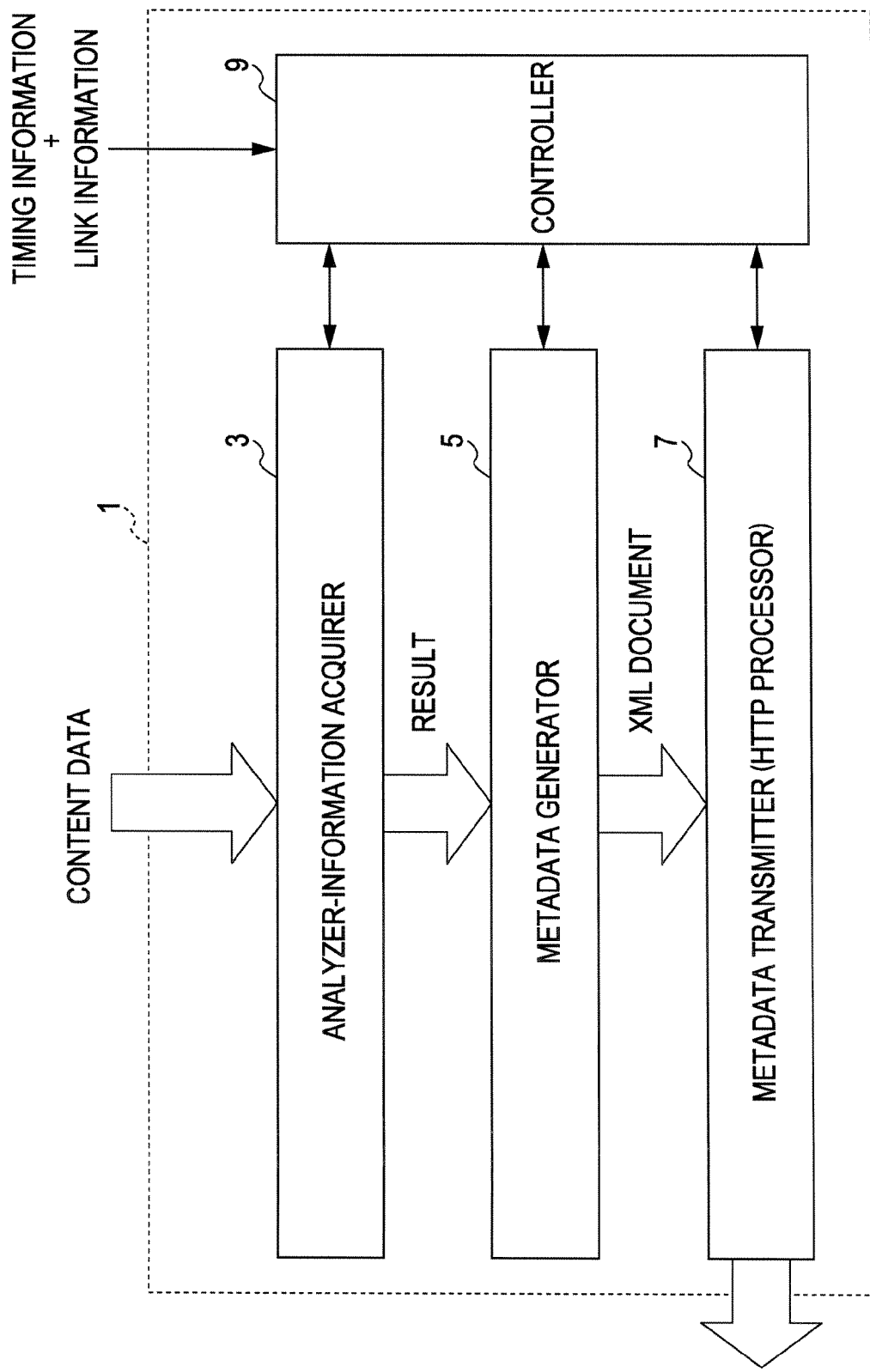
FIG. 15 is a block diagram showing an exemplary structure of a metadata transmitting unit having a function of generating the metadata with the link information.

FIG. 15 is a block diagram showing an exemplary structure of a metadata transmitting unit 1 including a device (metadata generator) that generates the metadata with the link information, described above.

The metadata transmitting unit 1 includes an analyzer-information acquirer 3, a metadata generator 5, a metadata transmitter 7, and a controller 9.

The analyzer-information acquirer 3 receives content data, such as image data or audio data, and information necessary for identifying the content data to analyze the data and/or acquire additional information.

For example, if the content data is image data and the analysis process is a process of detecting a mobile object, the analyzer-information acquirer 3 extracts information concerning the mobile object on the basis of the image data corresponding to several past frames.

The metadata generator 5 adds link information to the additional information (the body of metadata) supplied from the analyzer-information acquirer 3 to generate metadata. For example, the metadata generator 5 represents the body of the metadata and the link information in one XML document.

The one XML document generated in the metadata generator 5 may represent not only the metadata corresponding to one piece of the content data but also the metadata corresponding to multiple pieces of the content data.

The metadata transmitter 7 transmits the metadata packaged in the metadata generator 5 over a network.

The metadata is transmitted as a stream of the metadata, like the content data transmitted as a stream thereof.

For example, the XML document is encoded in Multipurpose Internet Mail Extension (MIME) or Direct Internet Message Encapsulation (DIME) and the metadata is transmitted as a Hyper Text Transfer Protocol (HTTP) stream.

The controller 9 synchronizes the analyzer-information acquirer 3, the metadata generator 5, and the metadata transmitter 7 with each other, starts and stops the transmission of the metadata, and so on. The controller 9 provides the metadata generator 5 with the link information.

First Exemplary Application System

Figure 16:
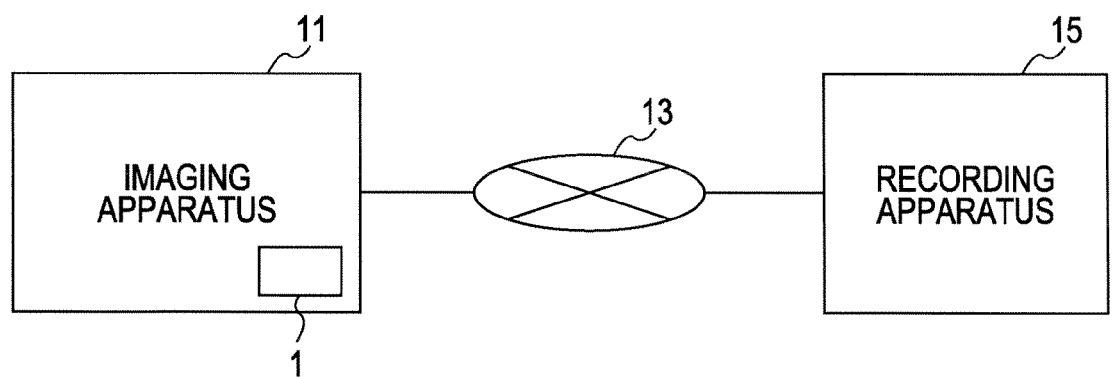
FIG. 16 illustrates an exemplary application system.

FIG. 16 illustrates a first exemplary application system. This system corresponds to a case in which image data captured with an imaging apparatus 11 (camera) is transmitted to a recording apparatus 15 over a network 13 as an MPEG or JPEG image stream.

The imaging apparatus 11 includes the metadata transmitting unit 1 described above. Accordingly, the correspondence can be maintained in this system even if the image data and the metadata are transmitted in separate streams.

The image data encoded in the MPEG format may be transmitted simultaneously with the image data encoded in the JPEG format.

Figure 17:
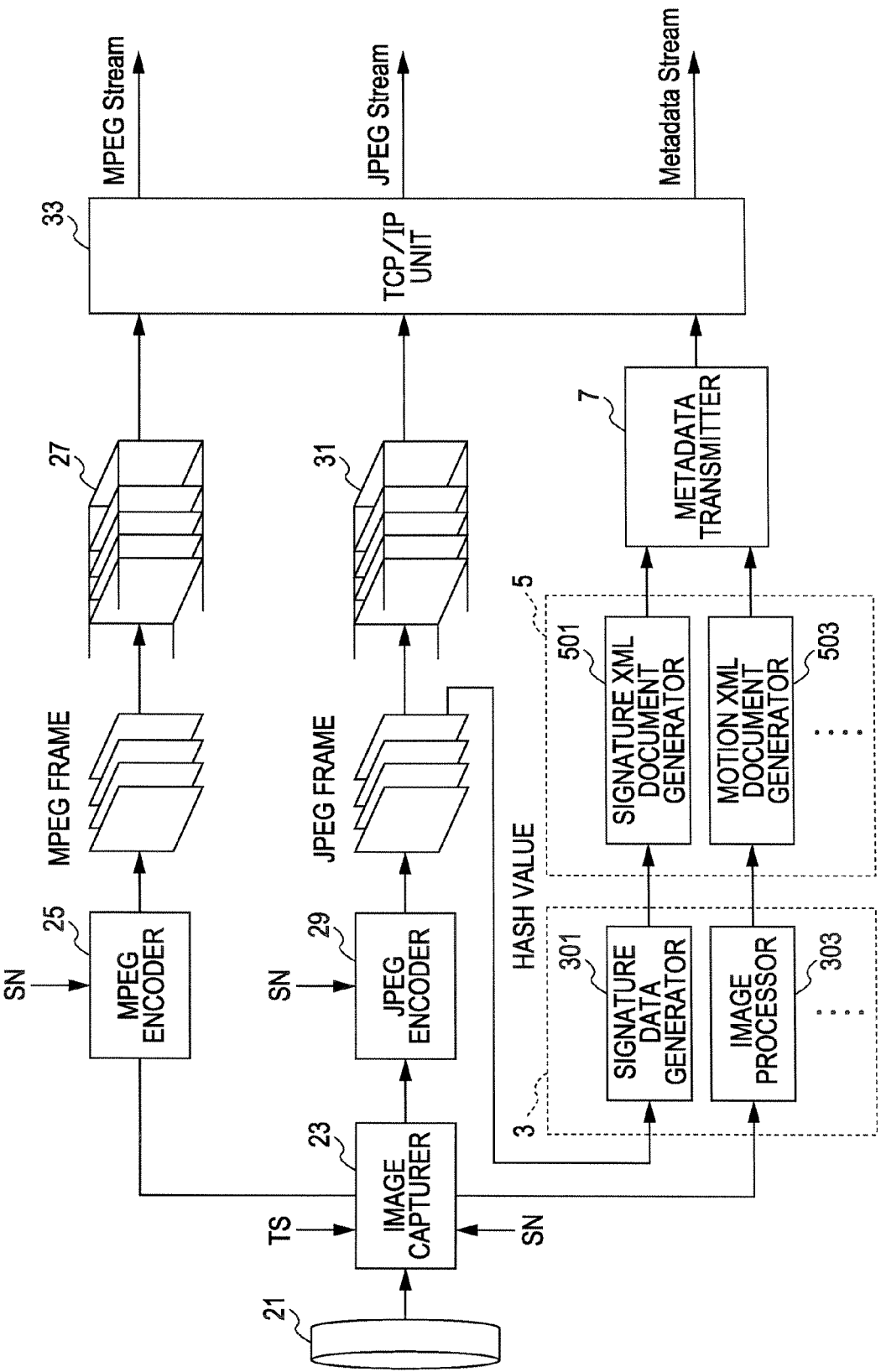
FIG. 17 is a block diagram showing an exemplary internal structure of an imaging apparatus.

FIG. 17 is a block diagram showing an exemplary internal structure of the imaging apparatus 11. In the example in FIG. 17, signature data allowing for detection of falsification of a JPEG image and a result of motion detection are transmitted as the metadata.

The imaging apparatus 11 includes an imaging unit 21, an image capturer 23, an MPEG encoder 25, a frame buffer 27, a JPEG encoder 29, a frame buffer 31, the analyzer-information acquirer 3, the metadata generator 5, the metadata transmitter 7, and a TCP/IP unit 33.

The imaging unit 21 includes a signal processing unit that performs known pre-processing for converting an electrical signal supplied from an imager into an image signal.

The image capturer 23 is a signal processing unit that captures the image signal to which a timestamp TS and a sequence number SN are added. The image capturer 23 supplies the original image signal to the MPEG encoder 25, the JPEG encoder 29, and the analyzer-information acquirer 3.

The motion detection (object detection) is performed to the original image data before it is encoded into a JPEG or MPEG data.

The analyzer-information acquirer 3 includes a signature data generator 301 for falsification detection and an image processor 303 for motion detection. A hash value resulting from encoding by hashing of the frame image after the JPEG encoding is used to generate signature data.

The signature data is converted into an XML document in a signature XML document generator 501 in the metadata generator 5. The result of the motion detection is converted into an XML document in a motion XML document generator 503 in the metadata generator 5.

Theses XML documents are combined into one in the metadata transmitter 7, and the combined document is transmitted over the network through the TCP/IP unit 33 as metadata associated with the image data. The metadata is transmitted asynchronously with the image data in a stream different from that of the image data.

Since only one imaging apparatus, which is a source of the image data, is used in the first exemplary application system, the link information may include only the content identification information without the device information. This is because the correspondence between the image data and the metadata can be identified with the device being not identified.

A combination of the content identification information and the device information may be used as the link information. The same applies to second and third exemplary application systems, described below.

Second Exemplary Application System

Figure 18:
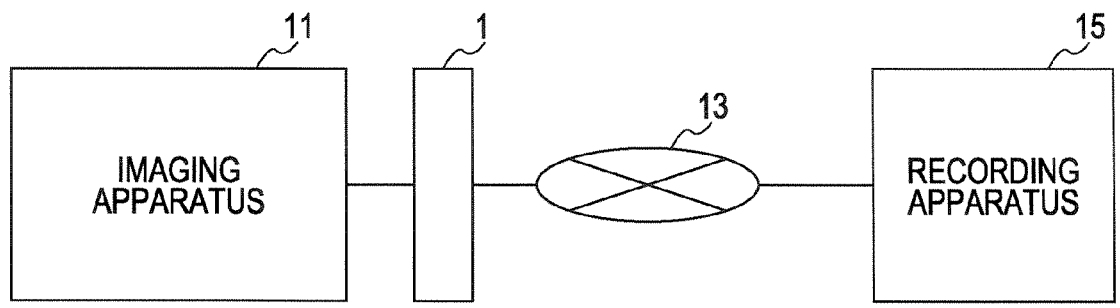
FIG. 18 illustrates another exemplary application system.

FIG. 18 illustrates a second exemplary application system. The system has a structure similar to that of the first exemplary application system shown in FIG. 16. However, the second exemplary application system differs from the first exemplary application system in that the metadata transmitting unit 1 is an external unit separated from the imaging apparatus 11.

The metadata transmitting unit 1 may be a transmitting unit dedicated to the imaging apparatus 11 or may be realized as a communication apparatus, such as a router, a modem, or a mobile phone, or a partial function of an information processing apparatus.

Third Exemplary Application System

Figure 19:
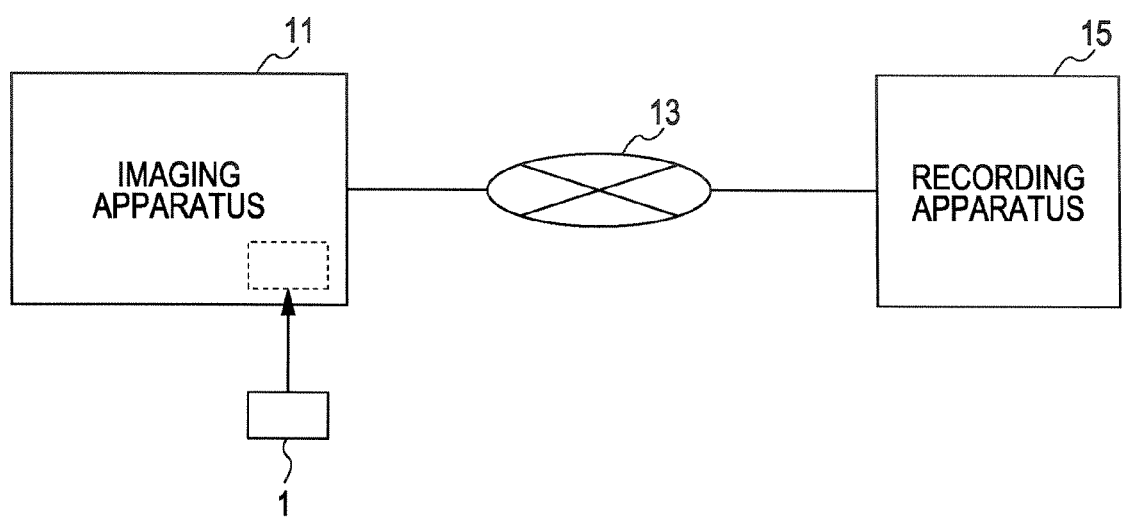
FIG. 19 illustrates another exemplary application system.

FIG. 19 illustrates a third exemplary application system. The third exemplary application system has the same structure as that of the first exemplary application system shown in FIG. 16. However, the third exemplary application system differs from the first exemplary application system in that the metadata transmitting unit 1 is detachable from the imaging apparatus 11.

For example, the third exemplary application system is preferable to a case in which the metadata transmitting unit 1 is housed in a portable card case that is inserted into a card slot of the imaging apparatus 11.

Fourth Exemplary Application System

Figure 20:
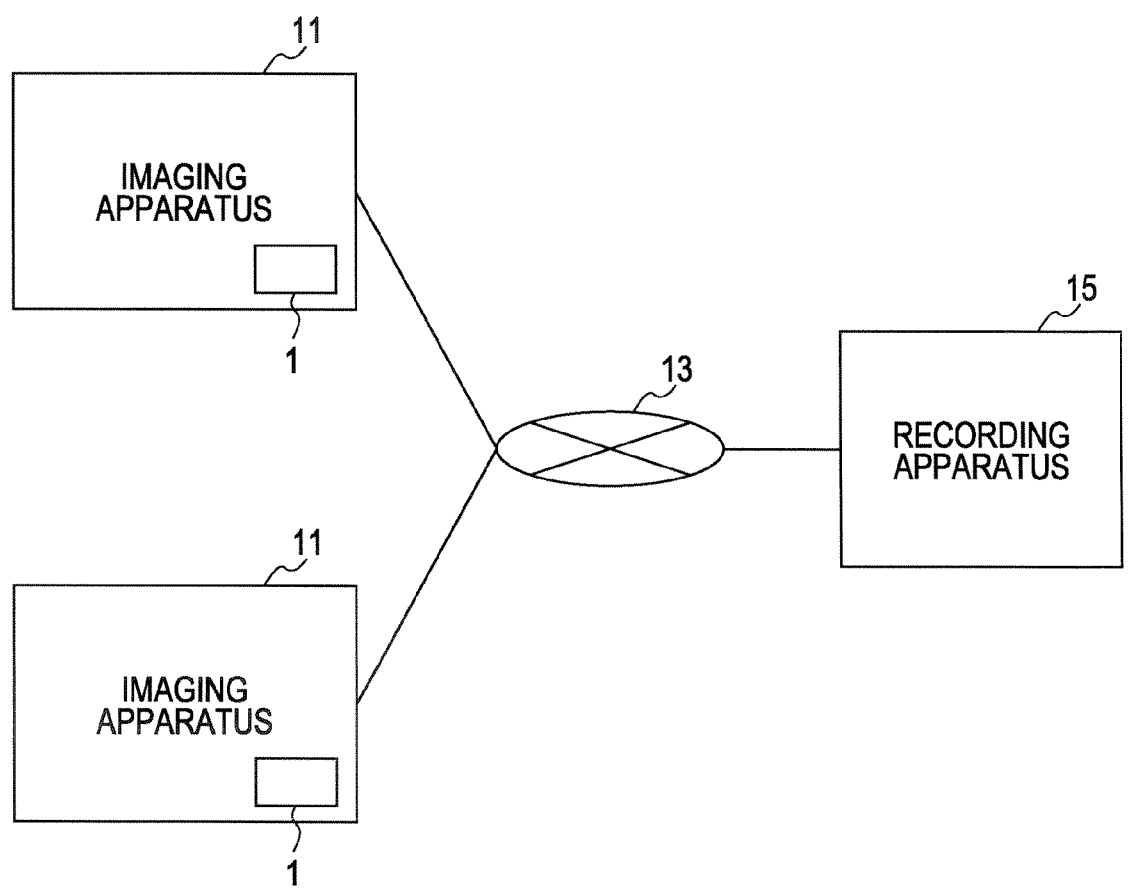
FIG. 20 illustrates another exemplary application system.

FIG. 20 illustrates a fourth exemplary application system. In this system, at least two imaging apparatuses 11, which are sources of image data, are connected to the network 13. The remaining structure is the same as the first exemplary application system, described above.

The fourth exemplary application system is preferable to a video conference system or a security system.

However, since multiple pieces of the image data can exist at the same time in this system, it is necessary to use a combination of the content identification information and the device information as the link information.

Other Embodiments

Although the metadata transmitting unit 1, which has the function (the metadata generator) of generating the metadata with the link information, is mounted in, inserted in, or externally connected to the imaging apparatus in the above exemplary application systems, the metadata transmitting unit 1 may be mounted in any information processing apparatus capable of processing the content data continuously generated in real time.

Although the content data and the metadata, which are received over the network, are recorded in the recording apparatus 15 in the above exemplary application systems, the receiving apparatus is not limited to the recording apparatus 15. The imaging apparatus may be connected to an information processing apparatus, such as a computer, or an output apparatus.

Although the link information is added to the metadata in the above embodiments, the link information is shared with the content data and, therefore, the link information may be added to the content data in the same manner as in the metadata.

The function of generating the metadata with the link information, described in the above embodiments, may be realized by a program. In this case, the program may be stored in a storage medium that is distributed or may be delivered over the network. The storage medium is, for example, a magnetic storage medium, an optical storage medium, or a semiconductor storage medium.

It should be understood by those skilled in the art that various modifications, combinations, sub-combinations and alterations may occur depending on design requirements and other factors insofar as they are within the scope of the appended claims or the equivalents thereof.

What is claimed is:

1. A computer-implemented metadata generating apparatus generating metadata associated with content data continuously generated in real time, the metadata generating apparatus comprising:
   an additional information acquiring unit includes a processor that acquires additional information corresponding to at least one piece of the content data, said content data being continuously generated in real-time, and said additional information acquiring unit stores the additional information in a computer readable medium; and
   a link information adding unit that adds link information uniquely identifying the at least one piece of the content data from other content data that is continuously generated in real-time and corresponding to the additional information to the corresponding additional information to generate the metadata.

2. The metadata generating apparatus according to claim 1, wherein the content data is image data captured with an imaging apparatus.

3. The metadata generating apparatus according to claim 1, wherein the content data is audio data.

4. The metadata generating apparatus according to claim 1, wherein the link information is information identifying the content data.

5. The metadata generating apparatus according to claim 4, wherein the information identifying the content data is a timestamp.

6. The metadata generating apparatus according to claim 4, wherein the information identifying the content data is a sequence number.

7. The metadata generating apparatus according to claim 4, wherein the link information includes information concerning a device that generates the content data.

8. The metadata generating apparatus according to claim 7, wherein the information concerning the device that generates the content data is information identifying a manufacturer of the device.

9. The metadata generating apparatus according to claim 7, wherein the information concerning the device that generates the content data is information identifying a model name of the device.

10. The metadata generating apparatus according to claim 7,
wherein the information concerning the device that generates the content data is a serial number specific to the device.

11. A computer-implemented information processing apparatus processing content data continuously generated in real time, the information processing apparatus comprising:
an additional information acquiring unit includes a processor that acquires additional information corresponding to at least one piece of the content data, said content data being continuously generated in real-time, and said additional information acquiring unit stores the additional information in a computer readable medium; and
a link information adding unit that adds link information uniquely identifying the at least one piece of the content data from other content data that is continuously generated in real-time and corresponding to the additional information to the corresponding additional information to generate metadata associated with the content data.

12. A computer-implemented imaging apparatus continuously generating image data in real time, the imaging apparatus comprising:
an additional information acquiring unit includes a processor that acquires additional information corresponding to at least one piece of the image data, said content data being continuously generated in real-time, and said additional information acquiring unit stores the additional information in a computer readable medium; and
a link information adding unit that adds link information uniquely identifying the at least one piece of the image data from other content data that is continuously generated in real-time and corresponding to the additional information to the corresponding additional information to generate metadata associated with the image data.

13. A computer-implemented video conference system comprising:
an imaging apparatus;
a microphone;
an additional information acquiring unit that acquires additional information corresponding to content data, said content data being continuously generated in real time, and said additional information acquiring unit in the imaging apparatus and the microphone; and
a link information adding unit that adds link information uniquely identifying at least one piece of the content data from other content data that is continuously generated in real-time and corresponding to the additional information to the corresponding additional information to generate metadata associated with the content data.

14. A computer-implemented security system comprising:
at least one imaging apparatus;
an additional information acquiring unit includes a processor that acquires additional information corresponding to captured data, said content data being continuously generated in real time, and said additional information acquiring unit in the imaging apparatus and stores the additional information in a computer readable medium; and
a link information adding unit that adds link information uniquely identifying at least one piece of the captured data from other content data that is continuously generated in real-time and corresponding to the additional information to the corresponding additional information to generate metadata associated with the captured data.

15. A computer-implemented method of generating metadata associated with content data continuously generated in real time, the method comprising the steps of:
acquiring additional information corresponding to at least one piece of the content data; and
adding link information uniquely identifying the at least one piece of the content data from other content data that is generated in real-time and corresponding to the additional information to the corresponding additional information to generate the metadata.

16. A computer readable medium having encoded therein a program with computer readable instructions that when executed by a computer generates metadata associated with content data continuously generated in real time to perform the steps of:
acquiring additional information corresponding to at least one piece of the content data and storing the information in a computer readable memory; and
adding via a processor link information uniquely identifying the at least one piece of the content data from other content data that is generated in real-time and corresponding to the additional information to the corresponding additional information to generate the metadata.

* * * * *